Sept. 30, 1924.  
A. E. GILMAN  
1,509,833  
CORN SHELLER  
Filed Jan. 19, 1924
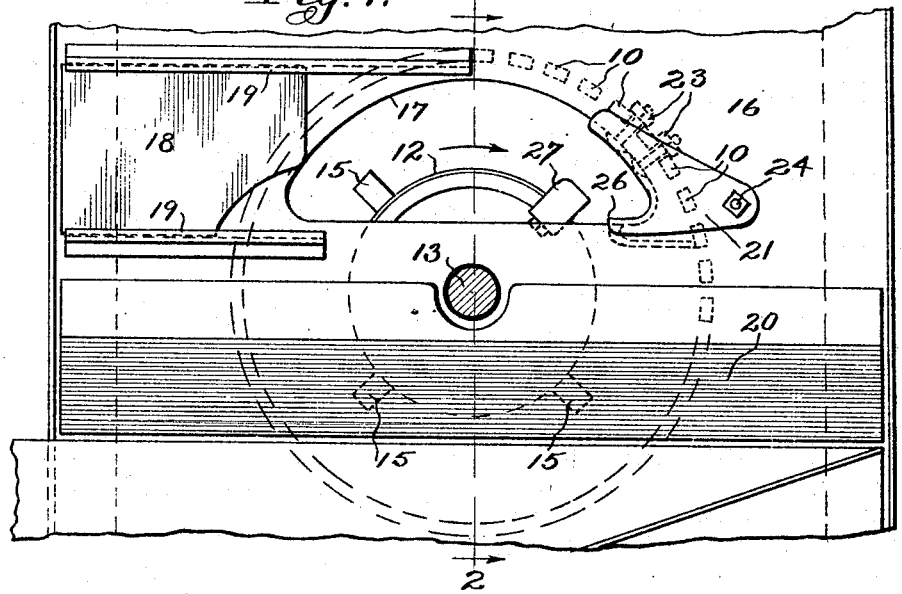
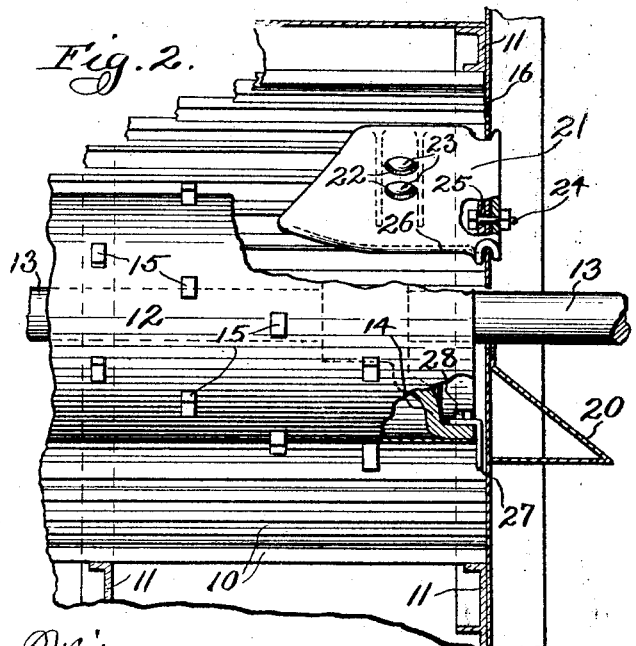
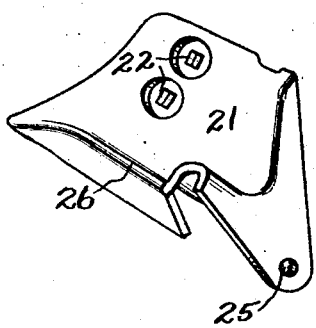
Witness:  
Richard J. Jacker
Inventor:  
Albert E. Gilman  
By John Howard McElroy  
his Atty.

Patented Sept. 30, 1924.

1,509,833

UNITED STATES PATENT OFFICE.

ALBERT E. GILMAN, OF OTTAWA, ILLINOIS, ASSIGNOR TO KING & HAMILTON COMPANY, OF OTTAWA, ILLINOIS, A CORPORATION OF ILLINOIS.

CORN SHELLER.

Application filed January 19, 1924. Serial No. 687,194.

*To all whom it may concern:*

Be it known that I, ALBERT E. GILMAN, a citizen of the United States, and a resident of Ottawa, in the county of La Salle and State of Illinois, have invented certain new and useful Improvements in Corn Shellers, of which the following is a specification.

My invention is concerned with corn shellers, and more especially with the mechanism by which the cobs and husks are delivered from the shelling concave to the cob chute.

To illustrate my invention, I annex hereto a sheet of drawings, in which the same reference characters are used to designate identical parts in all the figures, of which,—

Fig. 1 is an elevation of a portion of the machine showing the discharge end of the concave;

Fig. 2 is a view in section on the line 2—2 of Fig. 1; and

Fig. 3 is a perspective view of a casting employed in my invention.

I have shown my invention as applied to the well known "Ottawa" sheller, in which the concave is made up of the bars 10 arranged in a circle and supported on the castings 11. The cylinder 12, carried by the shaft 13, is journaled in the ends of the concave, and is preferably formed by a pair of heads 14, one of which is shown fastened on the shaft and having the cylinder 12 secured to said ends, with the customary teeth 15 bolted or otherwise secured to the periphery. The end of the concave is closed by the sheet-metal plate 16, which is provided with the discharge outlet 17, which is of the shape shown, and which may be provided with the plate 18 sliding in the ways 19, so that the effective area of the aperture 17 may be reduced. Looking at the apparatus from the position of Fig. 1, it will be understood that the shaft 13 rotates clockwise, and the ears of corn as they are forced from the receiving end to the discharging end are shelled by the cooperation of the teeth 15 with the bars 10 of the concave, and when the cobs reach the discharge end, the grains of corn will have been all removed, as well as substantialy all of the husks, if there were any husks when the corn was fed into the machine. The cobs are piled up toward the discharge end, and are carried up and eventually forced out through the outlet 17, where they drop on the deflecting plate 20 and are discharged into the cob chute, not shown. So much of the apparatus as has been thus far described, per se, forms no part of my invention.

Secured upon the inside of the concave in the position clearly shown in Figs. 1 and 2, is a casting 21 having the apertures 22 therein, which accommodate the bolts 23 passing between adjacent bars 10 and by which the casting 21 is held in place, it also being secured by a bolt 24 passing through an aperture 25 in the casting, and through a registering aperture in the sheet-metal end 16. This casting has a flange 26 on its lower edge projecting in a generally horizontal direction inward in a position where the cobs carried over to it by the end of the cylinder will be caught by the flange 26 and directed thereby out through the outlet 17. There is a tendency for the few husks that are connected with the cobs or else loose to catch upon the casting 21 and to clog up the outlet aperture at that point, and to prevent this action, I secure on the end of the cylinder the cleaning tooth 27, which preferably takes the general shape of a piece of angle iron, and has an aperture in the horizontal web thereof by which it can be secured in place on the inner periphery of the head 14 by the screw or bolt 28. The vertical web thereof projects radially outward between the head 14 and the sheet-metal end 16, and as the tooth passes the flange portion 26 of the casting, any husks or other material that may have collected at this point are virtually sheared away by the co-operating action of the end of the tooth and of the casting.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a corn sheller, the combination with a shelling cylinder, of a shelling concave in which the cylinder is mounted to rotate, said concave having an outlet opening in the discharge end thereof above the axis of the cylinder, a cob-deflecting plate projecting into the concave from one end of the outlet opening, and a cleaning tooth carried by the end of the cylinder and co-operating with said plate adjacent the outlet.

2. In a corn sheller, the combination with a shelling cylinder, of a shelling concave having longitudinal ribs and a sheet-metal end in which the cylinder is mounted to rotate, said sheet-metal end having an outlet opening above the axis of the cylinder, a cob-deflecting casting bolted at its back to the ribs and at the end to the sheet-metal end of the concave and projecting into the concave from one end of the outlet opening, and a cleaning tooth carried by one end of the cylinder and co-operating with said plate adjacent the outlet.

3. In a corn sheller, the combination with a shelling cylinder, of a shelling concave in which the cylinder is mounted to rotate, said concave having an outlet opening in the discharge end thereof above the axis of the cylinder, a cob-deflecting plate projecting into the concave from one end of the outlet opening, and a cleaning tooth angular in cross section and bolted by its horizontal web to the inside of the end of the cylinder and having its vertical web extending outside of the end of the cylinder and passing adjacent to the cob-deflecting plate.

In witness whereof, I have hereunto set my hand this 16th day of January, 1924.

ALBERT E. GILMAN.

In the presence of witnesses:
AUGUST LEDRICH,
C. FRED CLAUS.